United States Patent
Peak, Jr. et al.

(10) Patent No.: US 8,278,782 B2
(45) Date of Patent: Oct. 2, 2012

(54) ACTIVE PARASITE POWER CIRCUIT

(75) Inventors: Marvin Lyle Peak, Jr., Highland Village, TX (US); Bradley Mason Harrington, Carrollton, TX (US); Matthew Ray Harrington, Carrollton, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 252 days.

(21) Appl. No.: 12/641,136

(22) Filed: Dec. 17, 2009

(65) Prior Publication Data

US 2011/0149623 A1 Jun. 23, 2011

(51) Int. Cl.
*H01H 83/00* (2006.01)

(52) U.S. Cl. ........ 307/130; 327/333; 327/347; 327/434; 327/436; 327/437

(58) Field of Classification Search .................. 307/130, 307/149, 151; 323/267
See application file for complete search history.

(56) References Cited

U.S. PATENT DOCUMENTS

| 7,723,969 B1* | 5/2010 | Li ................................. 323/276 |
| 2010/0073976 A1* | 3/2010 | Kimura et al. .................. 363/95 |

* cited by examiner

*Primary Examiner* — Rexford Barnie
*Assistant Examiner* — Toan Vu
(74) *Attorney, Agent, or Firm* — Advent IP, P.C., L.L.O.

(57) ABSTRACT

A circuit is provided that includes a parasitic power circuit that powers a parasitic circuit. The parasitic power circuit derives a supply voltage from an external AC or other signal suitable for use as a communications signal. A PMOS transistor or transistors is utilized to enable a supply voltage capacitor to charge substantially to the same voltage as the channel voltage of the communications signal.

9 Claims, 5 Drawing Sheets

NORMAL - BLOCK LOW - P₁P₂ ON
PROGRAM - BLOCK HIGH ⇒ P₂ OFF

ACTIVE PARASITE POWER CIRCUIT

CROSS-REFERENCE TO RELATED APPLICATIONS

N/A

TECHNICAL FIELD

The present invention relates generally to an active parasite power circuit and method for its implementation. Exemplary active parasite power circuits obtain energy from a data I/O line and store such energy in a capacitor for use by an electronic device. More particularly, embodiments of the present active parasite power circuit charge a capacitive voltage in an I/O data line is in a logical "high" state, thereby supplying a slave IC power to operate even as the minimum channel voltage for data lines decrease below about 2 volts.

BACKGROUND

Referring now to FIGS. 1, 2 and 3, a prior art parasitic power circuit 10 is depicted. The parasitic power circuit 10 comprises a parasitic power capacitor 12, which is used to store voltage acquired parasitically from the data or I/O input 14. A blocking device 16, in the form of a diode transistor, allows a high signal on the signal line 18 to both power a slave device 20 with a voltage $V_{DD}$ and charge the parasitic power capacitor 12. During a low data signal on the signal line 18, the diode-transistor 16 is reverse biased and turned off. When the diode-transistor 16 is turned off, the $V_{DD}$ or voltage for the slave device 20 is the voltage held on the parasitic power capacitor 12.

FIG. 2 depicts a graph of an exemplary signal on signal line 18. The signal line goes high 22 to about 1.8 volts. While the signal line 18 is high 22, the diode-transistor 16 is forward biased and turned on such that the slave device (not particularly shown) is powered by the $V_{DD}$ voltage 20 while at the same time the parasitic power capacitor 12 is being charged (as shown in FIG. 3 between time 0 and about 10 microseconds). When the signal line 18 goes low 24, then the diode-transistor 16 is reverse biased and turned off such that the slave device receives its $V_{DD}$ voltage from the energy stored in the parasitic power capacitor.

FIG. 3 shows that in the prior art circuit, if the $V_{DD}$ 20 voltage is not used by a slave device, the parasitic power capacitor 12 will charge to about 1.25 volts 26. The 1.25 volts is due to the voltage drop across the prior art blocking device, diode-transistor 16, which limits the maximum voltage that the parasitic power capacitor 12 can be charged to.

Generally, with data or I/O communication signals, the high state 22 is an inactive state wherein a data signal 18 is not being transmitted on the signal line 18. When the signal line 18 goes low 23, may be indicative that data is about to be transmitted on the signal line 18. Various one-wire devices are powered parasitically from the data or I/O 14 such that a single I/O 14 connection and a ground connection are needed to power circuitry within a slave device.

The prior art parasitic power circuit 10 introduces a voltage burden to the generated $V_{DD}$ voltage 20. The voltage burden is equal to the minimum $V_{DD}$ voltage that slave circuitry, being powered by the $V_{DD}$ voltage 20, needs to operate plus the voltage drop across the diode-transistor 16 (VBE). The channel voltage, being the difference between the low voltage 24 and the high voltage 22 of the data signal 18, must have a minimum high voltage ($VIO_{min}$) that is high enough to keep the $V_{DD}$ voltage 20 at a voltage level high enough for the slave circuitry to operate. The equation describing the minimum required channel voltage is:

$$VIO_{min} ) VBE+(VTN+VTP)$$

wherein the $VIO_{min}$ is the minimum allowable channel voltage on the signal line 18, which must be greater than the working voltage of the slave circuitry. The working voltage of the slave circuitry can be defined by VTN+VTP wherein VTN is the voltage threshold of an N device and VTP is the threshold voltage of the P devices found in the circuitry of the slave device. VTN+VTP are thus considered the minimum voltage for the slave circuit to operate correctly. This minimum voltage is added to VBE, wherein VBE is the voltage drop from the base to the emitter of the diode-transistor 16. Thus, the minimum required channel voltage on the signal line 18 must be greater than the voltage drop across the diode-transistor 16 plus the minimum operating voltage of the slave circuit that the parasitic power circuit 10 is powering.

As technology advances, the channel voltages of microprocessor and other circuitry's signal lines is decreasing from about 2.5 volts to about 1.8 volts. Thus, the prior art parasitic power circuit 10, under good conditions, may only be able to produce a $V_{DD}$ voltage 20 of about 1.25 volts as shown in FIG. 3. 1.25 volts may not, in various circumstances, be a high enough working voltage to meet the minimum working voltage requirement of a slave circuit and provide for some design margin. What is needed is a new parasitic power circuit that can provide a $V_{DD}$ voltage for powering a slave circuit at a voltage that is closer than a prior art circuit to the channel voltage of the signal line that the parasitic power is being extracted from.

SUMMARY

Embodiments of the present invention provide an electronic circuit wherein the electronic circuit comprises a parasitic power circuit. The parasitic power circuit comprises a first PMOS transistor adapted to have a drain receive an input signal and a source electrically connected to a voltage supply output node. The parasitic power circuit further comprises a first comparison circuit adapted to receive the input signal and to provide a comparison output that turns on the first PMOS transistor when the input signal is above a predetermined comparison voltage. The exemplary circuit further comprises a parasitic circuit which is adapted to receive a supply voltage from the voltage supply output node of the parasitic power circuit.

In additional embodiments of the invention, the first comparison circuit may be further adapted to receive an input signal such that the comparison output is a Boolean result of the input signal and the invoke signal.

Embodiments of the invention may further operate wherein the input signal has a fall time, $t_{fall}$, wherein t is less than or equal to $\tau_{rec}$ divided by X, such that $\tau_{rec}$ is a recovery time and X is a measure of design margin. Furthermore, in some embodiments, the recovery time may be equal to an amount of time required to recharge a supply voltage capacitor, wherein the supply voltage capacitor is connected between the supply output node and a ground node.

In additional embodiments the power circuit may further comprise the second PMOS transistor that is electrically connected between the first PMOS transistor and the voltage output node such that the source of the first PMOS transistor and the source of the second PMOS transistor are electrically connected to the same node and such that the second PMOS transistor's drain is electrically connected to the voltage supply output node.

Other embodiments of the invention may comprise a parasitic power circuit having a PMOS transistor with a drain adapted to receive an input signal and; a comparison circuit having a first comparison input that receives the input signal and a second comparison input that receives a comparison signal. The comparison circuit provides an output (a gate signal) to the PMOS transistor such that when the gate signal turns the PMOS transistor ON, a PMOS transistor is adapted to provide a near zero resistance and/or voltage to the input signal and passes the input signal to a VDD supply node, wherein the VDD supply node is adapted to provide power to a parasitic circuit. When the PMOS transistor is OFF, the PMOS transistor is adapted to operate as a reverse biased diode-transistor. A capacitor may be electrically connected between the VDD supply node and a ground node.

In yet other embodiments of the invention, an electronic circuit comprising a parasitic power circuit and a parasitic circuit may be provided. The parasitic power circuit comprises a first PMOS transistor having a first drain, a first gate and a first source. The first drain may be connected to receive an input signal. The first source may be electrically connected to a VDD supply node wherein the VDD supply node may be connected to a capacitor and to the parasitic circuit. The parasitic power circuit may further comprise a comparison circuit that is adapted to receive the input signal. The comparison circuit provides a comparison output that is electrically connected to the first gate.

In some embodiments, the comparison circuit may also receive an invoke signal such that the comparison output switches the PMOS transistor OFF when the invoke signal indicates that the first PMOS transistor should not pass the input signal to the VDD supply node. The comparison circuit may switch the PMOS transistor ON when the invoke signal indicates that the first PMOS transistor may pass the input signal to the VDD supply node and the input signal's voltage level is greater than a predetermined voltage level. When the first PMOS transistor is switched ON, a near zero resistance is provided between the drain and the source such that the capacitor connected to the VDD supply node may charge to substantially the maximum voltage of the input signal's voltage level or channel voltage. The channel voltage being the difference between the normal high and normal low voltage levels of the input signal.

In yet other embodiments of the invention, the parasitic power circuit may further comprise a second PMOS transistor having a second drain, a second gate and a second source. The second PMOS transistor may be connected between the first PMOS transistor and the VDD supply node such that the second source is electrically connected to the first source and the second drain is electrically connected to the VDD supply node. A second comparison circuit may also be provided that receives a programming signal such that an output of the second comparison circuit is provided to the second gate of the second PMOS transistor. This output switches OFF the second PMOS transistor when the programming signal indicates that the parasitic circuit is in a programming mode. The output will switch the second PMOS transistor ON when the programming signal indicates that the parasitic circuit is not in a programming mode and the input signal's voltage is greater than the predetermined voltage.

BRIEF DESCRIPTION OF THE DRAWINGS

For a more complete understanding, reference is now made to the following description taken in conjunction with the accompanying Drawings in which.

DETAILED DESCRIPTION

Figure 1:
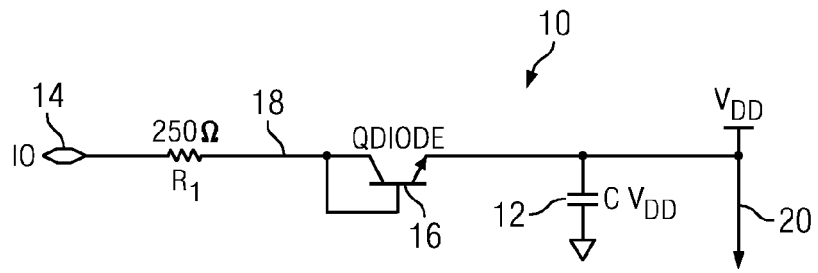
FIG. 1 illustrates a circuit diagram of a prior art parasitic power circuit.
Figure 2:
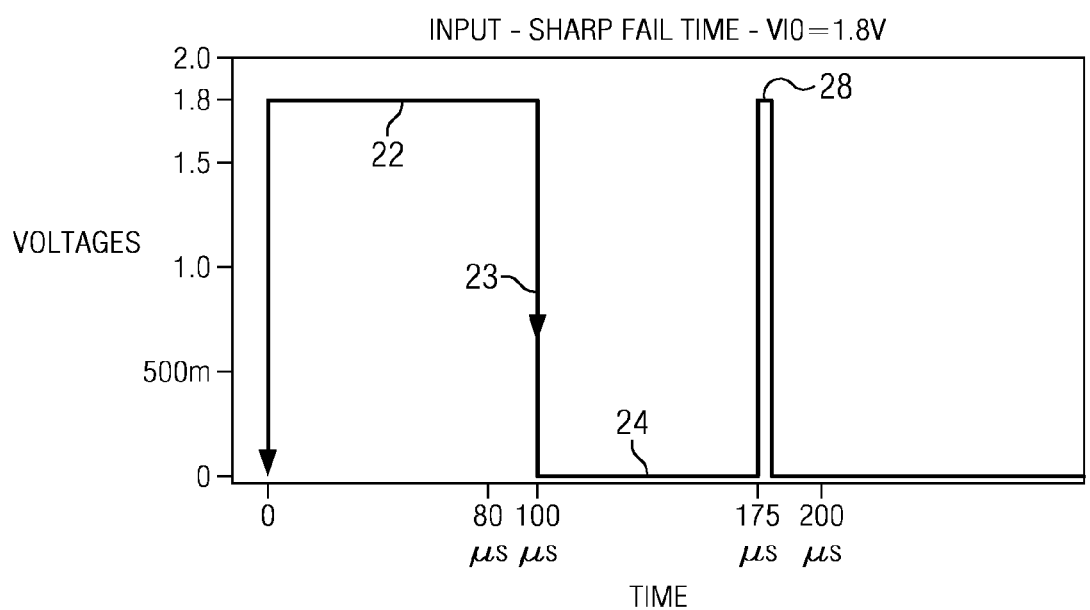
FIG. 2 depicts a voltage vs. time graph of an exemplary data or I/O signal.

Referring now to the drawings, wherein like reference numbers are used herein to designate like elements throughout, the various views and embodiments of an active parasite power circuit are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 4:
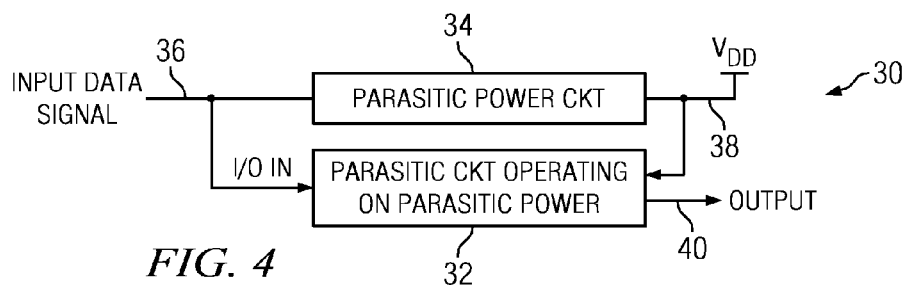
FIG. 4 is a general block diagram of a parasitic power circuit powering a slave or other circuit.

FIG. 4 depicts a block diagram of a general parasitic power circuit configuration 30 in accordance with embodiments of the invention. The circuit 32, which operates on parasitic power, may be a circuit found in silicon or otherwise that is a memory circuit, a programmable logic circuit, can contain an electronic algorithm, a processor, or could be substantially any circuit that is to be operated using power extracted from an input data signal 36. Input data signal 36 is provided to both a parasitic power circuit 34 and the parasitic circuit 32. When the input data signal is high, it may be charging a capacitor within the parasitic power circuit 34 as well as providing the $V_{DD}$ voltage 38, which powers the parasitic circuit 32. When the input data signal 36 is in a low state (or below a predetermined voltage), energy stored in the parasitic power circuit 34 provides the $V_{DD}$ voltage 38 that powers the parasitic circuit 32. All the while the input data signal may be received as an input data signal by the parasitic circuit 32 such that, for example, an output 40 can be provided.

Embodiments of the invention remove the burden of VBE almost completely from the $VIO_{min}$ voltage requirement of a parasitic circuit. When an exemplary embodiment almost completely removes the burden of the VBE voltage drop, then the resulting $V_{DD}$ voltage can be nearly or substantially equal to the channel voltage of the input data signal. In other words, the maximum $V_{DD}$ supply voltage for the parasitic circuit may almost or substantially equal the high data signal or channel voltage of the input data signal (the data-high voltage). The importance of embodiments of the invention is that the VBE voltage is substantially or nearly removed from the $VIO_{min}$ equation, which is important because the resulting $V_{DD}$ or supply voltage that is being used to power a parasitic circuit can be a higher voltage than one that could be provided by a prior art parasitic power circuit. From an alternate perspective, embodiments of the invention allow for a lower channel voltage on the input data signal line to be used to parasitically power a parasitic circuit than previously required channel voltages.

Figure 5:
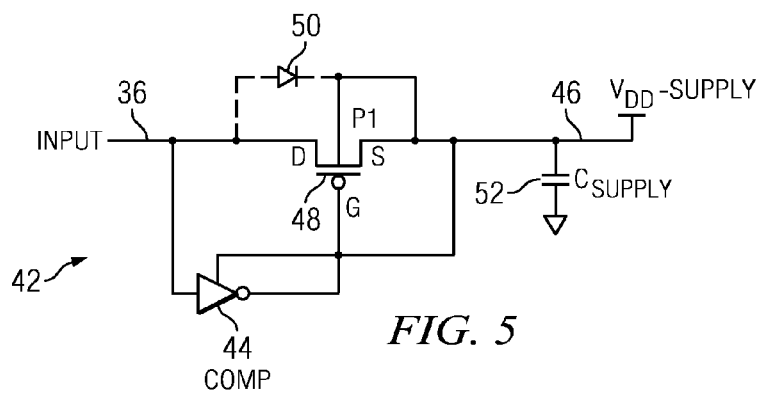
FIG. 5 is a schematic of an exemplary active parasitic power circuit.

FIG. 5 depicts a schematic of an embodiment of the invention 42. An input line receives a data signal, for example, from an external source. The parasitic power circuit 42 comprises a comparator in, for example, its simplest form, as an inverter. The comparator 44 compares the input signal 36 to a threshold. The threshold voltage may be a logic signal or a voltage between the $V_{DD}$ supply voltage 46 and ground. If the comparison circuit 44 senses that the voltage at the input 36 is near the $V_{DD}$ supply voltage 46, it turns ON a P-channel transistor 48. The P-channel, in its ON operating state, will pass the high input voltage signal to the $V_{DD}$ supply node 46 with essentially no voltage drop. The signal is passed almost as if the P-channel were a short. The well of the P-channel is connected to the source side of the transistor 48 such that when the P-channel transistor 48 is turned off (i.e., the input signal is exhibiting a low state), then the P-channel 48 will act like a diode 50 and disallow current to flow from a charged supply capacitor 52 back toward the input of the exemplary circuit 42.

The comparator 44 may be more complicated than a simple inverter circuit in various embodiments. The comparison circuit 44 may be a complex circuit used to move the thresholds for turning on and off the P-channel transistor 48 at precise differences between the voltage on the input signal 36 and the voltage desired at the $V_{DD}$ supply node 46. When the data signal 36 is high, the comparison circuit 44 turns the P-channel device 48 ON and when the input signal is below or drops below a predetermined threshold the comparison circuit turns the P-channel transistor 48 OFF. When the P-channel is ON, the supply capacitor 52 is being charged and when the P-channel transistor 48 is OFF, it is stopping current flow from the supply capacitor 52 from discharging the supply capacitor 52 and providing current back into the input line of the exemplary embodiment.

Figure 6:
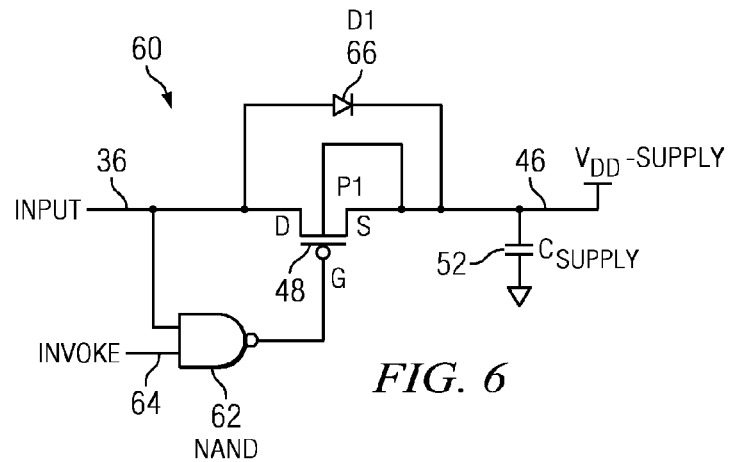
FIG. 6 is a schematic of another exemplary active parasitic power circuit.

In FIG. 6 another parasitic power circuit embodiment 60 is depicted. An input signal 36 is provided to an input of a NAND gate 62. The NAND circuit 62 may also be used to act like a simple comparison circuit. When both the input signal 36 and the invoke signal 64 are high then the NAND device 62 will output a low signal which is inverted at the P-channel MOS transistor 48 and will turn the transistor ON. As with other embodiments, the P-channel transistor 48 will act substantially like a short and allow the high input signal 36 to charge the supply capacitor 52 toward a voltage substantially equal to the channel voltage. Also, the input signal will provide $V_{DD}$ supply voltage 46 to a parasitic circuit (not specifically shown in this figure). Under certain circumstances, this embodiment 60 may have the invoke signal 64 kept low. If the invoke signal 64 is kept low, the P-channel transistor 48 will not turn on regardless of whether the input signal 36 is in high state. Instead, the diode 66 will turn on when the input signal 36 is about 0.7 volts (the voltage drop across the diode 66) above the voltage found on the supply capacitor 52 at the $V_{DD}$ supply voltage node 46. When the invoke signal 64 is low this exemplary circuit operates very similarly to the circuit shown in FIG. 1. Thus, in this exemplary embodiment 60, there is an option to not invoke this circuit and have it operate as a prior art device or to invoke the circuit using the invoke signal 64 to utilize the near zero voltage drop across the P-channel transistor 48 in accordance with embodiments of the present invention.

Figure 3:
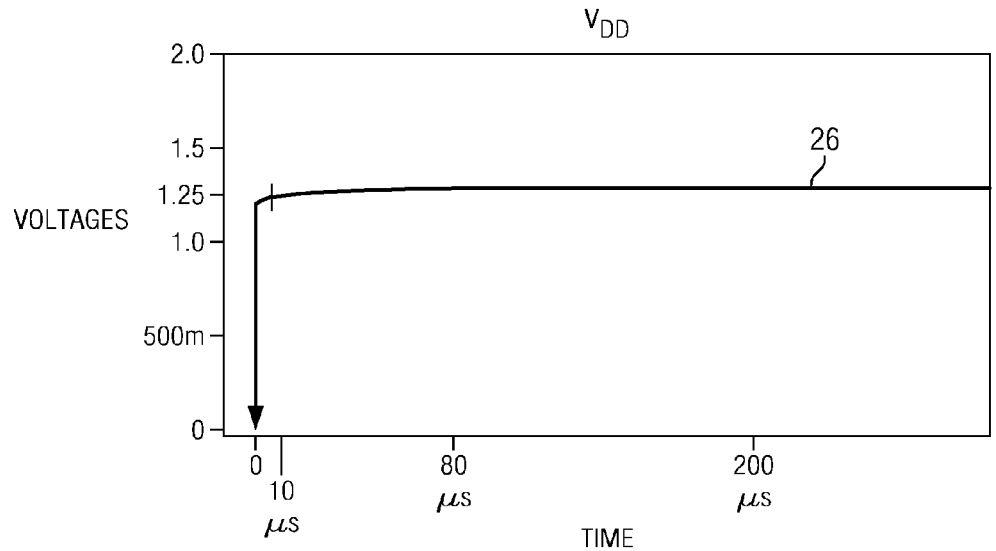
FIG. 3 is a voltage vs. time graph of a prior art parasitic power circuit output voltage.
Figure 8:
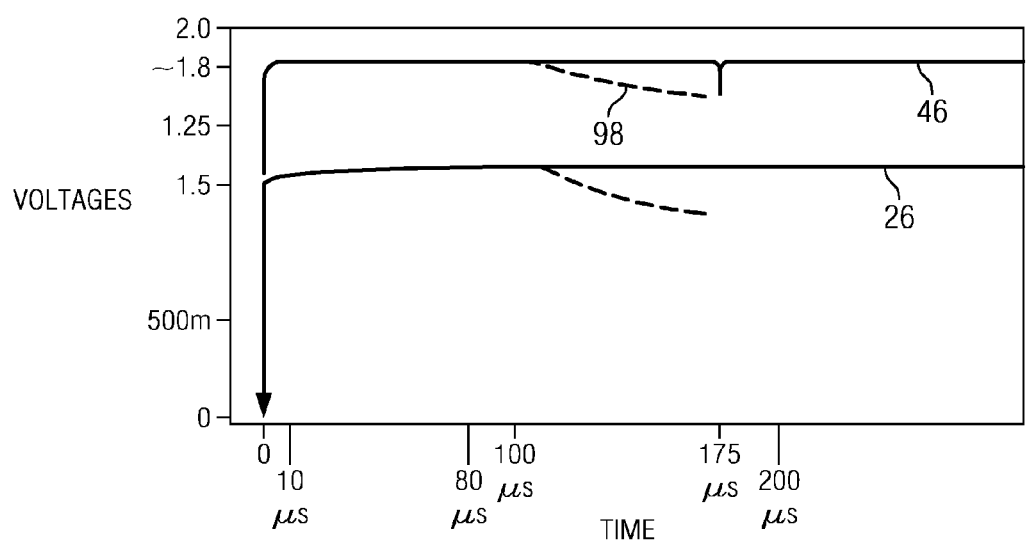
FIG. 8 is a voltage vs. time graph comparing the $V_{DD}$ output of an exemplary embodiment with the $V_{DD}$ output of a prior art parasitic power circuit.

Referring to FIG. 8, a graph of voltage vs. time for the $V_{DD}$ supply output voltage of the prior art vs. an exemplary active parasitic power circuit is depicted. For a prior art $V_{DD}$ voltage 26 wherein the input signal high voltage or channel voltage is 1.8 volts, the $V_{DD}$ voltage 26 will have a maximum of about 1.25 volts as shown in FIG. 8 and FIG. 3. Conversely, when the invoke signal 64 is high and the exemplary circuit turns the P-channel transistor 48 ON when the input signal 36 is also high and has a high input voltage of about 1.8 volts, the $V_{DD}$ supply voltage 46 can be substantially close to 1.8 volts as well.

In embodiments of the invention that are similar to embodiment 60, use of the invoke signal 64 will depend on the fall times of the input signal 36. If the input signal 36 has a fall time that is fast enough, then the invoke signal 64 will be turned on using the P-channel transistor aspect of embodiments of the invention. If the fall time of the input signal 36 is too slow and the invoke signal 64 is high, the P-channel may be turned on as the input signal, for example, is rising toward its maximum value, but if the input signal takes too much time to achieve its maximum high value, the supply capacitor 52 may discharge through the P-channel transistor 48 into the input line 36, which is undesirable. Thus, with relatively slow fall times for input signal 36, the invoke signal 64 may be held low such that only the diode 66 is used to turn on and charge the supply capacitor and turn off such that the $V_{DD}$ supply voltage 46 is not discharged to the reverse bias of the diode 66.

Figure 7:
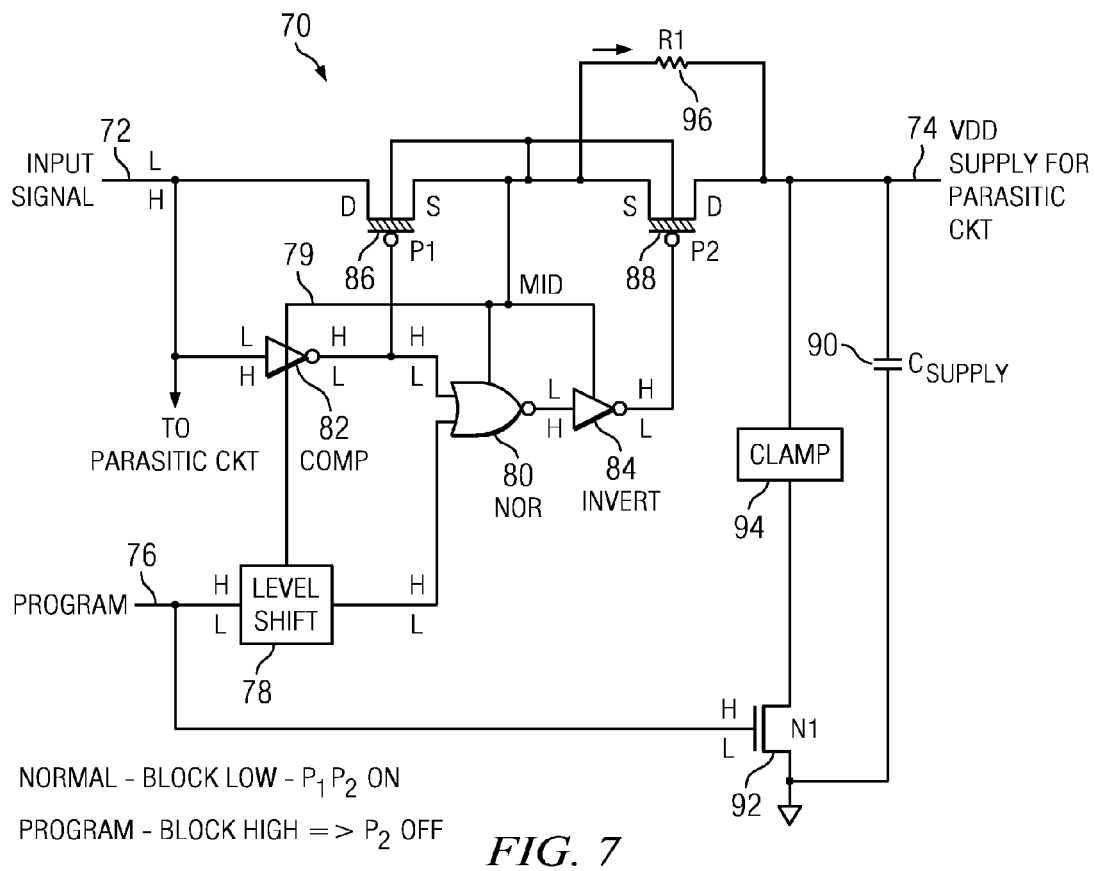
FIG. 7 is another schematic of an exemplary active parasitic power circuit.

Referring now to FIG. 7, another embodiment of an active parasitic power circuit 70 is depicted. The active parasitic power circuit 70 may be used when the input signal 72 may be switched to an increased high voltage that is well above, for example, a high signal voltage of 1.8 or 2.5 volts, for a certain amount of time. Thus, the input signal 72 may normally operate with an input signal having a low of about 0 volts and a high of about 1.8 volts, but under certain circumstances, the input signal high may be increased to a voltage much higher than the normal 1.8 volts. A circumstance wherein such an input signal 72 may exist is when an input signal is being used to program memory within the parasitic circuit. In other words, the input signal 72 may be utilized to program non-volatile memory, but the parasitic power circuit would still be required to provide the appropriate $V_{DD}$ supply voltage 74 for the parasitic circuit. In yet other words, embodiment 70 allows the parasitic power circuit to switch between accepting a normal data high/low signal 72 and a higher voltage input signal 72 such that the higher voltage input signal 72 can be utilized in, for example, programming a non-volatile memory, meanwhile, the $V_{DD}$ supply voltage 74 is clamped at a safe voltage for operating the associated circuitry operating at its normal required voltage. Various types of non-volatile memory might be programmed in a parasitic circuit. Such types of non-volatile memory may include flash memory, $E^2$ memory, EPROM memory, and other types of memory which fall into the non-volatile electrically programmed memory category.

Still referring to FIG. 7, when this embodiment 70 is operating under a normal input signal 72 conditions, the program signal 76 will be held low. The low program signal 76 is provided to a non-inverting level shifter circuit 78, which may provide a low signal to one of the inputs of the NOR device 80. At the same time, when the input signal 72 is high the input to the comparator circuit 82 is high thereby producing a low output signal to the first P-channel transistor 86 turning it ON. At the same time, the output of the comparison circuit 82 is providing its low to the second input of the NOR device 80, which provides a high output to the input of the inverter device 84, which in turn provides a low output to the gate of the second P-channel transistor 88 turning it ON as well. Thus, the first P-channel transistor 86 and the second P-channel transistor 88 are both ON allowing a high input signal to appear at the $V_{DD}$ supply voltage node 74 without significant voltage drop or resistance through the first and second P-channel transistors 86 and 88. At the same time, since the program signal 76 is being held low, in normal mode, the N-channel transistor 92 is OFF creating essentially an open circuit between the $V_{DD}$ supply 74 and ground (i.e., between clamp 94 and ground). Thus, the supply capacitor 90 can be charged by a high input signal 72. The high input signal 72 in normal mode (non-program mode) will also power the associated parasitic circuit (not specifically shown). When the input signal 72 is low, the parasitic circuit will use the energy stored in the supply capacitor 90 to operate its circuitry.

If, for example, the attached parasitic circuit is in program mode wherein its non-volatile memory is being programmed via the input signal 72 then the input signal 72 may be operating at a signal high voltage that is too high a voltage for the $V_{DD}$ supply voltage 74 for use by the parasitic circuit. In this circumstance, an exemplary parasitic power circuit 70 will have its program signal 76 switched to a high state. A high program signal 76 will turn ON the transistor 92, which will utilize the clamp circuit 94 to clamp the $V_{DD}$ supply voltage to a safe predetermined maximum $V_{DD}$ supply voltage 74 for use by an associated parasitic circuit. Meanwhile, the high program signal 76 will be provided via the non-inverting level shifter 78 to the NOR device 80 as a high and thereby produce a low output from the NOR device regardless of the high or low state of the input signal 72. The low output of the NOR device 80 will be provided to the inverter 84. The inverter will then output a high signal, which will turn OFF the second P-channel transistor 88. With the second P-channel transistor 88 in an OFF state, the first P-channel transistor 86 may be intermittently turned ON by the input signal 72 when the input signal is in a high state. The resistor 96 in combination with the first P-channel transistor 86 will operate similarly to a transistor diode with a voltage drop such that the voltage being provided to the $V_{DD}$ supply node 74 is at a level that can be clamped by the clamp circuit 94 to a predetermined voltage that is safe and useable by the attached parasitic circuit while the attached parasitic circuit is receiving the programming input signal 72.

Thus, embodiments of the parasitic power circuit 70 can operate at a lower input signal channel voltage (for example, 1.8 volts) yet still be utilized when switched via the program signal 76 to provide power to a parasitic device during a higher channel width programming voltage at the input signal 72.

Referring to FIG. 8 it should be understood that the $V_{DD}$ supply voltage 46 is being shown wherein there is no power draw from an associated parasitic circuit. If there were a power draw from an associated parasitic circuit then the dotted line 98 depicts the $V_{DD}$ supply voltage 74 decreasing as the supply capacitor 52, 90 discharges.

Furthermore, embodiments of the invention are not limited to operating with a single or one-wire data signal bus, but may be used to draw parasitic power from two-wire, I²C, three-wire, SPI bus, the data lines of a USB data connection or various other data signal lines or AC lines wherein one might want to extract power parasitically therefrom in order to power another circuit.

Embodiments of the invention utilize a PMOS device rather than the formerly used non MOS devices to act as the diode-transistor in prior parasitic power circuits. When a PMOS device is used in embodiments of the invention it is important that the rise and fall of the input signal must be fast enough such that the PMOS device is not turned on for too long a time period before the input signal reaches its maximum high signal state or else the PMOS device will act as a short circuit and drain the energy from the supply voltage capacitor 90, 52 toward the signal input. For any communication protocol, a recovery time, $\tau_{rec}$, should be calculated specified such that the communication line returns to an inactive state (a logic "high" inactive state) for a certain period of time satisfying the following equation:

$$t_{fall} > \tau_{rec}(\text{specified by the communication protocol}) \div X$$

where X is a measure of the desired design margin for having enough time to charge the supply capacitor. This equation may be referred to as the required fall time equation. The required fall time of the data signal must be less than or equal to the amount of signal high time (inactive time) that is needed to recharge the supply capacitor divided by the design margin (the amount of over design or over charging that you want to be able to charge the capacitor with to make sure that it is completely charged within the design). For example, if X is equal to a design margin of Z, then the designer wants to make sure that the $\tau_{rec}$ time is twice as long as minimally required It is important that the fall time of the data signal is not too long such that it discharges the supply capacitor. If the data input signal has a fall time that is longer than the $\tau_{ree}$ time divided by the design margin then an exemplary active parasitic power circuit may need to be switched to an alternate mode using for example, the diode 66 in FIG. 6 or by turning off the P-channel transistor 48 shown in FIG. 5 in order to charge the $V_{DD}$ supply capacitors 52. Thus, it is an important aspect of embodiments of the invention that the data signal fall time is less than or equal to the $\tau_{rec}$ divided by a desired design margin in order for embodiments to operate in a mode where the supply capacitor is charged by the input data signal enough to maintain a higher voltage for the parasitic circuit (i.e., parasitic circuit 32) to operate. Because of the fall time concern associated with signals having relatively large channel voltages, parasitic power circuits of the past did not incorporate PMOS transistors into their design in a manner taught by the various embodiments of the exemplary invention.

As X increases the required fall time of any particular data input signal must decrease in order for the capacitor to maintain the voltage at or above the needed voltage to operate an attached parasitic circuit.

Figure 9:
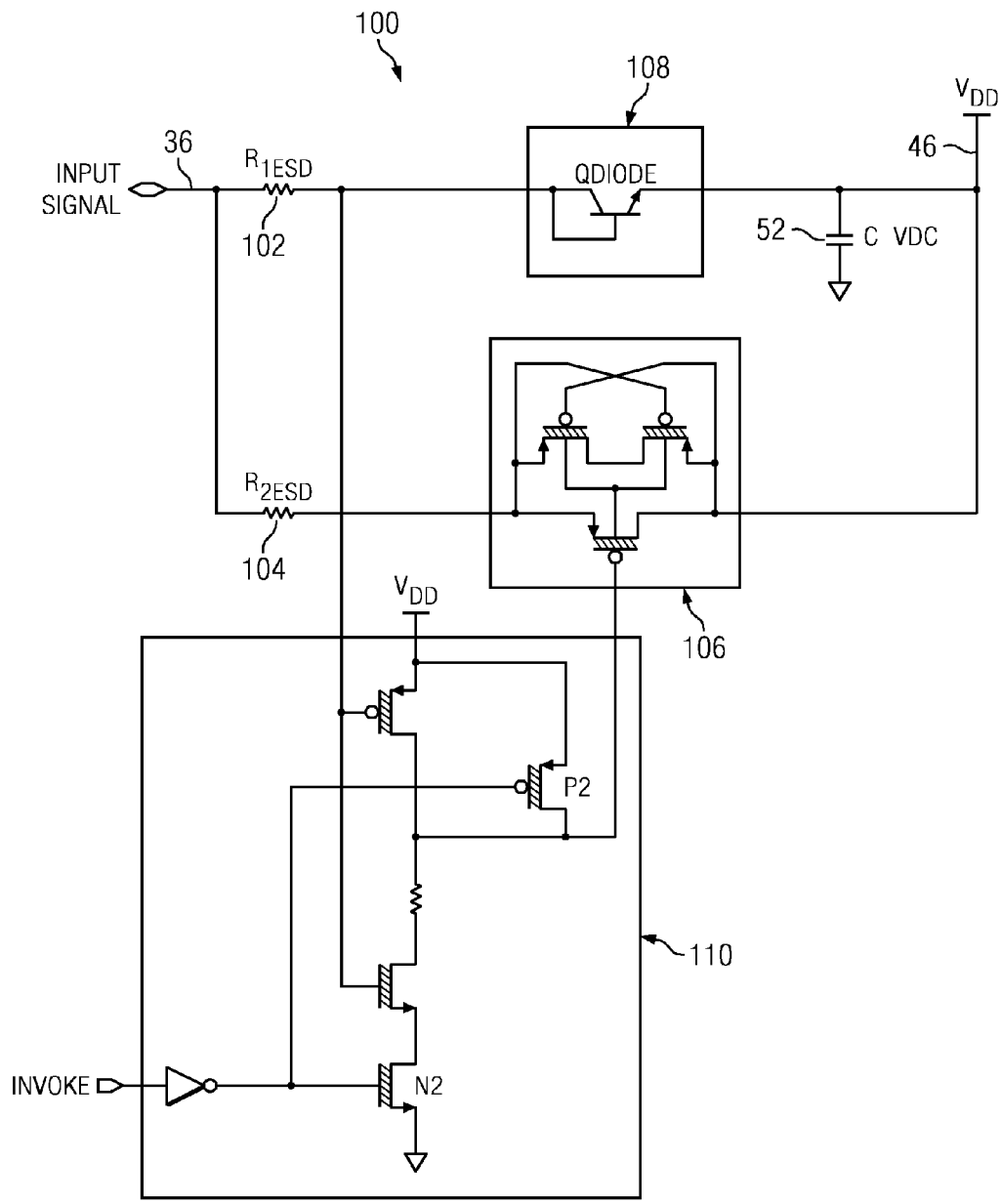
FIG. 9 is a schematic of an exemplary implementation of an active parasitic power circuit.

Referring now to FIG. 9, a practical implementation of an embodiment of an exemplary active parasitic power circuit 100 is depicted. The practical implementation if an embodiment of an exemplary active parasitic power circuit 100 may be one exemplary implementation of the exemplary circuit shown in FIG. 6. Here an input signal 36 may be provided to an exemplary active parasitic power circuit 100. Resistors 102 and 104 may be considered electrostatic discharge resistors to help guard against electrostatic discharge that may be on the input signal line 36. Furthermore, resistors 102 and 104 may be used to help limit the discharge current during a signal fall. For example, resistor 104 is put in series with the equivalent circuit for a PMOS transistor 106 (i.e., equivalent to PMOS transistor 48) to help limit the discharge current when the input signal 36 is falling. An equivalent circuit for a diode 108 may be one implementation of the diode 66. The supply capacitor 52 is shown such that it can store electrical energy for the $V_{DD}$ supply node 46. An equivalent circuit for a NAND gate 110 is shown having a invoke signal input 64. The equivalent NAND gate circuit 110 may be equivalent to or an implementation of the NAND gate 62 shown in FIG. 6. In essence, the exemplary active parasitic power circuit 100 may be one exemplary implementation or design for placement on a silicon die.

As such, embodiments of the invention may provide an internal $V_{DD}$ supply voltage that is substantially equal to the channel voltage provided by an input signal to an exemplary active parasitic power circuit. Such an implementation of an active parasitic power circuit allows integration of parasitic circuits into next generation systems and data busses that operate at lower channel voltages than the previously used 2.5 volt normal channel voltage range and provide a higher working voltage for a parasitic circuit.

It will be appreciated by those skilled in the art having the benefit of this disclosure that this active parasite power circuit provides a means for operating a dependent parasitic circuit in systems wherein channel voltages of data lines are in a range from about 1.8 volts to about 1.2 volts and perhaps lower. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A circuit comprising:
   a parasitic power circuit, the parasitic power circuit comprising:
   a PMOS transistor having a drain configured to receive an input signal and a source electrically connected to a voltage supply output node; and
   a comparison circuit configured to compare the input signal to a threshold voltage between a supply voltage and ground and to provide a comparison output to turn on the PMOS transistor when the input signal is above the threshold voltage so that the PMOS transistor passes the input signal to the voltage supply output node; and
   a parasitic circuit configured to received voltage from the voltage supply output node.

2. The circuit of claim 1, wherein the first comparison circuit is an inverter circuit.

3. The circuit of claim 1, wherein the first comparison circuit is further adapted to receive an invoke signal, the comparison output being a Boolean result of the input signal and the invoke signal.

4. The circuit of claim 1, wherein the input signal has a fall time $t_{fall}$, wherein $$t_{fall} \leq \frac{\tau_{rec}}{X}$$

such that $\tau_{rec}$, is a recovery time and X is a measure of design margin.

5. The circuit of claim 4, wherein the recovery time is equal to an amount of time required to recharge a supply voltage capacitor, the supply voltage capacitor being connected between the supply output node and a ground.

6. The circuit of claim 1, wherein the parasitic power circuit further comprises:
   a second PMOS transistor electrically connected between the first PMOS transistor and the voltage output node such that the source of the first PMOS transistor and the source of the second PMOS transistor are connected to a same node, and such that the second PMOS transistor's drain is electrically connected to the voltage supply output node, 7. The circuit of claim 6, wherein the parasitic power circuit further comprises a clamp circuit electrically connected between the voltage supply output node and ground, the clamp circuit adapted to clamp the voltage supply output node to a predetermined voltage when the parasitic power circuit receives a program signal.

8. The circuit of claim 1, wherein when the comparison circuit is contoured to provide a comparison output to turn off the PMOS transistor when the input signal is below the threshold voltage so that the PMOS transistor is configured to operate as a diode-transistor.

9. The circuit of claim 1, wherein the parasitic circuit is configured to receive the input signal.

* * * * *